3,356,634
DECORATIVE SURFACE COVERINGS CONTAINING IMBEDDED CHIPS COMPRISING VINYL CHLORIDE POLYMER, CHLORINATED POLYETHYLENE AND FILLER
John V. McGinley, Hackensack, N.J., assignor to Allied Chemical Corporation, New York, N.Y., a corporation of New York
No Drawing. Filed May 25, 1965, Ser. No. 458,776
8 Claims. (Cl. 260—31.8)

This invention relates to plastic flooring compositions, and more particularly to decorative flooring compositions in which particles or chips of filled plastic are dispersed in a plastic matrix.

Of interest to the vinyl flooring industry are products having more aesthetically pleasing patterns such as those having variegated or mosaic effects. One such type of product has compounded vinyl chips containing pigments and other fillers randomly dispersed in a plasticized vinyl matrix or overlay which is clear or translucent in the more premium products.

Such products are usually produced by processes which require application of pressure to both the matrix and chips. For example, a typical process involves dispersing the chips on a molding surface and covering with the vinyl matrix resin which is usually in the powder or particulate form. The materials on the surface are then molded, e.g., by pressing at elevated temperatures, to form the product.

Unfortunately, the pressures applied at the elevated temperatures required to form such products tend to distort or smear the chips which causes a loss of sharp definition of the final pattern and a depreciation of the aesthetic value of the product.

An object of the present invention is to provide new and improved decorative vinyl flooring products.

Another object is to provide improved vinyl chip floor covering in which compounded vinyl chips are dispersed in a vinyl matrix as discrete particles which are not smeared or blended into the matrix.

Another object is to provide an improved method of manufacture of decorative vinyl chip flooring in which the smearing or tendency of the compounded chip to blend into the matrix is alleviated.

Other objects and advantages will be evident from the following description of the invention.

In accordance with the present invention it has been found that the smearing or undesirable distortion of the particles or chips in decorative vinyl flooring products may be eliminated by incorporation in a highly filled vinyl chip or particle formulation of between about 5 to 35% by weight of total resin binder of a chlorinated polyethylene having a chlorine content between about 30–55% by weight, preferably 40–50% by weight, and high weight average molecular weight corresponding to an intrinsic viscosity of at least about 3.0 up to about 6.0 in o-dichlorobenzene at 100° C., said chlorinated polyethylene also desirably characterized by having crystallinity between about 5% to 35% as measured by differential thermal analysis. The balance of the resin binder for the chips may be any suitable vinyl chloride polymer conventionally used heretofore in the preparation of vinyl chip compositions. The addition of the chlorinated polyethylene to the particulate chip material results in chips which do not smear or undesirably blend into the vinyl chloride matrix during the molding operation for production of the decorative floor covering. Also, the incorporation of the preferred high molecular weight chlorinated polyethylene in the chip composition enables the addition of larger amounts of filler material in the chip composition and accordingly produces not only an improved product but also a product of low cost. More specifically, the particles or chips employed in the decorative floor covering products of the invention are produced from compositions comprising: (A) 100 parts of resin binder composed of 5% to 35% by weight, preferably 15% to 30%, of the chlorinated polyethylene and from about 65 to 95%, preferably 70% to 85%, of a vinyl chloride polymer resin, said chlorinated polyethylene having chlorine content between about 30–55% by weight, preferably 40–50% by weight, and high molecular weight corresponding to an intrinsic viscosity between about 3.0 to 6.0 in o-dichlorobenzene at 100° C., said chlorinated polyethylene preferably also having crystallinity between about 5% to 35%, more preferably 10 to 30%, as measured by differential thermal analysis; (B) about 20 to 60 parts of plasticizer for said resin binder; and (C) between about 300–600 parts by weight filler, preferably about 350–500 parts by weight filler.

The addition of the chlorinated polyethylene to the vinyl chip formulation requires no special procedure and the entire operation for producing the chips and the floor covering products incorporating said chips may be carried out in conventional apparatus and according to conventional procedures with the advantageous exception that smearing or undesirable distortion of the chips in the matrix is eliminated and a high quality decorative product produced. Pressures applied during molding may be as conventionally employed and range from about 200 to 2000 p.s.i., more usually 400 to 1500 p.s.i. Temperatures are also as conventionally employed and range generally from about 250° F. to 400° F., more usually between 300° F. to 375° F. The vinyl chloride polymer employed both in make-up of the matrix and in the vinyl chip formulation may be any of the vinyl chloride resins conventionally employed or suitable for the manufacture of vinyl floor covering products. Such vinyl chloride resins include the homopolymers of vinyl chloride and copolymers of vinyl chloride and copolymers with vinyl acetate and vinylidene chloride containing predominantly vinyl chloride. Suitable copolymers may be obtained commercially, for example, those containing about 85% vinyl chloride and 15% of vinyl acetate. Satisfactory results may also be obtained with blends of the vinyl chloride polymers and polyvinyl acetate and/or polyvinylidene chloride resins, the blends containing predominantly the polyvinyl chloride resin being generally preferred. The vinyl resins usually employed have molecular weight corresponding to an intrinsic viscosity between about 0.4 to 1.5 in cyclohexanone at 30° C., most desirably an intrinsic viscosity between about 0.6 to 1.3 in cyclohexanone at 30° C. Such vinyl resins also usually have a density between about 1.2 to 1.5.

The relative proportions of vinyl matrix and chips may vary widely over a range in which the chips represent between about 30–80% by weight of the total product, depending often on the desired decorative effect. For economic reasons it is generally preferred to employ the higher proportions of chips between about 60–75% by total weight of the product.

The chlorinated polyethylene combined with the vinyl chloride polymer to form the binder for the chips is a specific high molecular weight chlorinated polymer of ethylene derived by chlorination of a linear, high density, highly crystalline, high molecular weight polymer of ethylene. The terms "linear" or "substantially linear," as used herein and the appended claims, shall mean a polyethylene characterized by high density and at most only nominal short chain branching in the form of methyl groups, usually less than about 10 methyl groups per 1,000 carbon atoms in the molecule, more commonly 0 to 5 methyl groups per 1,000 carbon atoms. Density of such linear polyethylene is at least about 0.93, usually between about 0.935 to 0.985. The molecular weight of the polyethylene starting material is at least approximately 700,000 ranging up to about 5,000,000. The chlorinated polyethylene is desirably produced by chlorination in a medium which remains heterogeneous with respect to the polymer during chlorination. Most preferably the chlorination is carried out in aqueous slurry under controlled temperature and chorine feed conditions. Chlorination temperatures to produce the especially preferred products are desirably regulated between 80° C. to 120° C., preferably between about 90° C. to 120° C., with control being effected to avoid any substantial periods during which the temperature approaches or exceeds the crystalline melting point of the polyethylene. Preferably, the chlorination is commenced at the lower temperatures between about 80–110° C. and increased slowly after addition of the first 10–20% chlorine to higher temperature between 105° C.–120° C. Rate of chlorination is desirably controlled such that the rate of chlorine introduction is between about 0.05 to 0.5 pound of chlorine per pound of polyethylene charged per hour. Preferably, the chlorination is initiated at a lower feed rate between about 0.1 to 0.2 until the first 10–20% chlorine is added and then increased to a higher rate between about 0.2 to 0.5 pound of chlorine per pound of polyethylene per hour. Chlorination time depends upon rate of chlorine introduction and is usually a matter of several hours until the desired 30–55% by weight chlorine is added to the polyethylene. The particularly preferred chlorinated polyethylenes have chlorine content of 40–50% by weight. The chlorinated polymers of ethylene employed in the invention also desirably have characteristic crystallinity and glass transition temperatures which contribute to elimination of smearing or blending of the chips during molding. Such chlorinated polyethylenes are crystalline materials in that they contain residual polyethylene crystallinity in an amount of at least 5% up to about 35% as measured by differential thermal analysis. In providing such crystalline chlorinated polyethylenes it is required to have a polyethylene starting material of high crystallinity of at least about 70%, preferably 75% to 90%, and to conduct the chlorination as above described to produce a chlorinated polyethylene in which the desired amount of crystallinity is retained. Preferably, the chlorinated polyethylene has crystallinity between about 10% to 30% as measured by differential thermal analysis. Glass transition temperatures of these crystalline chlorinated polyethylenes range from about 16° C.±25° C. for the 30% chlorine chlorinated polyethylene up to about 71° C.±7° C. for the 55% chlorine material. The more preferred chlorinated polyethylenes of 40–50% chlorine have glass transition temperatures ranging from about 27° C.±20° C. for the 40% chlorine content chlorinated polyethylene up to about 51° C.±14° C. for the 50% chlorine content polymer. Glass transition temperatures for other chlorinated polyethylenes within the 30–55% chlorine range may be readily determined by plotting the values indicated for the four chlorine contents given. The glass transition temperature itself is a second order transition temperature and can be determined by plotting stiffness modulus of the sample as a function of temperature, and can be defined as the temperature at which the stiffness modulus of the sample possesses a value of $1.45 \times 10^4$ p.s.i. or $10^9$ dynes/cm.$^2$. The determination may be made in accordance with ASTM Test D1053–61.

Plasticizer is incorporated in the vinyl chip composition in an amount generally between about 20 to 60 parts by weight per 100 parts of the vinyl chloride-chlorinated polyethylene resin base. Preferably, the amount of plasticizer is between about 25 to 40 parts per 100 parts of the resin binder. The optimum amount of plasticizer chip formulation depends largely on amount of filler and chlorinated polyethylene employed. The vinyl matrix also contains plasticizers. When the matrix contains little or no filler materials the vinyl chloride polymer matrix will also contain plasticizer in amounts between about 15–60 parts, more usually 20–40 parts per 100 parts of the vinyl chloride polymer resin. The plasticizers which may be employed generally in the chips or matrix are those generally suitable for use in vinyl flooring compositions. Such plasticizers include the ester type plasticizers and the epoxidized drying oils. The more preferred esters are the monomeric esters of acids such as phosphoric, phthalic, adipic, sebacic, etc. Suitable alcohols for forming the monomeric esters having generally about 4 to 16 carbon atoms, more usually 4 to 12 carbon atoms. Examples of such plasticizers include tricresyl phosphate, dioctyl phthalate, 2-ethylhexyl phthalate, diisodecyl phthalate, butylcyclohexyl phthalate, dicyclohexyl phthalate, dicapryl phthalate, diocetyl adipate, and dibutyl sebacate. Epoxidized soya bean oil is a preferred example of an epoxidized drying oil which may be used in formulation of the tile compositions.

In producing the decorative floor products of the invention the vinyl chips and vinyl matrix are different in color or shade of color to provide the decorative, aesthetically pleasing appearance of the product. Various pigments and dyes may therefore be employed in make-up of the compositions of the invention. The vinyl chip formulation will contain fillers of a granular or pigment type. Examples of such filler materials include the clays, calcium carbonate, barytes, asbestine, talc, calcium sulfate, silica, mica, etc., as well as conventional colored pigments such as titanium dioxide, carbon black, phthalocyanine green or blue, chrome yellows, etc. Coarse fillers such as pulverized marble or limestone may also be used, if desired. Fibrous fillers may also be employed in the chip formulation, for example, asbestos, cork, wood flour, etc., usually asbestos. Various dyes or other color additives may be employed in the make-up of the vinyl matrix, for example, to produce tinted or other color effects in a translucent vinyl matrix. The amount of filler material in the vinyl chip formulation is relatively large by reason of the chlorinated polyethylene and the large amounts of filler and chlorinated polyethylene are believed to together constitute the important factor in eliminating smearing of the chips during molding. Usually, the amount of filler material will range from at least about 300 up to 600 parts by weight per 100 parts of total chip binder, more usually between about 350–500 parts by weight.

Stabilizers may also be included in the compositions to protect the vinyl polymer and chlorinated polyethylene against possible decomposition by the heat of processing, etc. Such stabilizers as are conventional in the preparation of vinyl polymer and copolymer sheet compositions are suitable, for example, organic complexes and/or salts of lead, tin, barium, cadmium, zinc, sodium, etc. The usual small quantities of such stabilizers are effective; for instance, 2 to 10 parts per 100 parts of the resin binder.

The chlorinated polyethylenes found to eliminate smearing of the vinyl chip compositions during molding are derived by chlorination of linear, highly crystalline, high density polyethylene having ultra high molecular weight such that the chlorinated linear polyethylene produced therefrom has high weight average molecular weight corresponding to an intrinsic viscosity of at least about 3.0 to 6.0 in o-dichlorobenzene at 100° C. The more preferred chlorinated polyethylenes have weight average molecular weight corresponding to an intrinsic viscosity between about 3.6 to 5.0. Suitable linear, highly crystalline poyethylene starting material will have weight average molecular weight of at least approximately 700,000 up to about 5,000,000. Particularly suitable linear high molecular weight polyethylene which may also be characterized by containing long chain polyethylene branches is produced, as described particularly in Example 6 of British Patent 858,674 of June 11, 1961 to Allied Chemical Corporation, by gas phase polymerization of anhydrous, oxygen-free ethylene below the softening point of the polyethylene over a porous, frangible catalyst of an inorganic compound of chromium and oxygen and an active metal alkyl on a support of the group consisting of silica and silica-alumina. The polyethylene produced thereby contain residue of the chromium-silica catalyst systems dispersed throughout the polyethylene in an amount of at least about .001%, usually .001–.002% by weight. The chromium-silica catalyst material added during polymerization is retained in the polyethylene during chlorination and contributes to the characteristic properties of the chlorinated polyethylene produced therefrom. Prior to chlorination such polyethylene has a density between about 0.935 to 0.985 and a crystallinity of at least 75%, and customarily in the range of 75% to 85%, as determined by differential thermal analysis. The preferred polyethylenes produced by British Patent 858,674 have weight average molecular weight between 1.0 million and about 5.0 million, more usually between 1.0 to 3.5 million, as calculated according to the method of P. S. Francis et al. from the viscosity of about 0.05 to 0.1 gram per 100 cc. solution in decalin at 135° C. using the equation:

$$n = 6.77 \times 10^4 M^{0.67}$$

where $n$ = intrinsic viscosity
$M$ = weight average molecular weight (J. Polymer Science, vol. 31, pp. 453–466—September 1958).

The following examples in which parts and percentages are by weight demonstrate the practice and advantages of the present invention. Example 1 demonstrates the present invention while Example 2 is given for purposes of comparison. The chlorinated polyethylene employed in the examples had a chlorine content of 45%, a crystallinity of about 20% as measured by differential thermal analysis, a glass transition temperature of about 38° C. as determined by ASTM Test D1053–61, and a weight average molecular weight corresponding to an intrinsic viscosity of 4.0 o-dichlorobenzene at 100° C. The chlorinated polyethylene was prepared by chlorination in aqueous slurry from a polyethylene having a weight average molecular weight of about 1.6 million and produced in accordance with Example 6 of British Patent 858,674. In preparing the polyethylene the catalyst system was magnesium dichromate on a porous silica-alumina support with aluminum triisobutyl. The chlorination of the polyethylene was conducted in about 20 times its weight of water and commenced at a temperature of 100° C. and at a chlorine feed rate of 0.2 pound of chlorine per pound of polyethylene charged per hour. The chlorination temperature and feed rate were maintained fairly constant until sampling showed that about 17% chlorine have been added to the polyethylene. Chlorination was continued at an increased temperature of 110° C. and at a chlorine feed rate of about 0.3–0.5 pound of chlorine per pound of polyethylene charged per hour to add the desired 45% chlorine to the polyethylene.

EXAMPLE 1

The vinyl chip composition employed in this example had the following formulation:

Table 1

| Component: | Parts |
| --- | --- |
| Polyvinyl chloride | 75 |
| Chlorinated polyethylene | 25 |
| Dioctyl phthalate | 23 |
| Butyl cyclohexyl phthalate | 10 |
| Epoxidized soya bean oil | 5 |
| Titanium dioxide | 17 |
| "Metasap" 635 | 3 |
| Stearic acid | 1.2 |
| Clay | 153 |
| Calcium carbonate filler | 297 |

In the above formulation the polyvinyl chloride had a weight average molecular weight corresponding to an intrinsic viscosity of about 1.3 in cyclohexanone at 30° C. "Metasap" 625 is a trademark for a barium zinc soap stabilizer. The calcium carbonate filler was obtained under the trademark "Atomite." The epoxidized soya bean oil was obtained under the trademark "Paraplex" G–62.

The composition formulated as above was charged to a laboratory Banbury Mixer, Model B. B, and compounded therein for about 5–10 minutes at a drop temperature of 350° F. and at ram pressure of 40 p.s.i. From the Banbury the stock was fed to a 8 inch by 16 inch differential two-roll mill and sheeted out therefrom at differential roll temperatures of about 250° F. and 350° F. The stock from the roll mill was broken up to form chips and test specimens including discs having thickness of 0.075 inch and diameter of 0.875 sheet. The sheet from the mill and chips obtained therefrom were evaluated as to pertinent properties and the results given in Table 2, below:

Table 2

| Test: | Result |
| --- | --- |
| Hardness, D ASTM D–10766 | 72 |
| Armstrong Inden., percent Fed. Spec. L–S–00450 | 8.3 |
| Recovery, percent Fed. Spec. L–S–00450 | 69 |
| Flex. Test Fed. Spec. L–S–00450 | Pass |
| Tensile, p.s.i. ASTM D–412 | 1875 |
| Elongation, percent ASTM D–412 | 15 |
| Rossi Peak Flow at 305° F. ASTM D–569–48 | 0.15 |
| Flow-Out, IN$^2$, 315° F., 800 p.s.i.g. (On Discs in Carver Press) | 1.27 |

The matrix-forming composition was prepared by dry blending at about room temperature about 270 parts of medium molecular weight polyvinyl chloride resin with 51 parts of the dioctyl phthalate and 5 parts of the epoxidized soya bean oil. A sample of the resulting granular resin was milled on a two-roll rubber mill and sheeted out to obtain test specimens having thickness of about 0.075 inch. Evaluation of the specimens show the matrix composition to have a Rossi Peak Flow at 305° F. of 0.52 and a Flow-Out at 315° F. under 800 p.s.i.g. of 1.62 inches.

Vinyl chip floor tiles were then prepared employing a standard laboratory mold press having a 4 cavity mold and adapted to simultaneously produce 4 6 x 6 inch tiles. The vinpl chips were dispersed on the bottom surface of each of the 4 mold cavities and covered with sufficient granular matrix-forming composition to completely fill the cavities. The chips represented 72% by weight of the charge while the matrix-forming composition represented correspondingly 28% by weight. The mold was closed and the tiles produced by first subjecting the charge to heat at a platen temperature of 320° F. for 5 minutes at a normal pressure followed by an additional 5 minutes at pressure of 600–1000 p.s.i. at the same platen temperature. The tiles removed from the mold after cooling contained 62% by volume of chips and correspondingly 38% by volume of the vinyl matrix. Upon evaluation and testing the tiles were found to satisfy the requirements for floor covering including hardness, flexibility, indentation and indentation recovery, tensile strength and chemical resistance. Visual inspection of the tiles showed a good and clear matrix with the chips therein distinctly defined with clear margins and without smearing or fusion into the matrix.

EXAMPLE 2 (COMPARISON)

For purposes of comparison vinyl chip tiles were prepared similar to Example 1 except that the vinyl chips were prepared without the addition of the chlorinated polyethylene. The vinyl chips had the formulation set forth below in Table 3.

Table 3

| Component: | Parts |
|---|---|
| Polyvinyl chloride | 100 |
| Dioctyl phthalate | 23 |
| Butyl cyclohexyl phthalate | 10 |
| Epoxidized soya bean oil | 5 |
| Titanium dioxide | 17 |
| "Metasap" 635 | 2.5 |
| Stearic acid | 1.0 |
| Clay | 82 |
| Calcium carbonate filler | 158 |

The sheet of the chip-forming composition and chips obtained therefrom were evaluated as in Example 1 and the results are given in Table 4 below:

Table 4

| Test: | Result |
|---|---|
| Hardness, D ASTM D–10766 | 72 |
| Armstrong Inden., percent Fed. Spec. L–S–00450 | 13 |
| Recover, percent Fed. Spec. L–S–00450 | 54 |
| Flex. Test Fed. Spec. L–S–00450 | Pass |
| Tensile, p.s.i. ASTM D–412 | 1850 |
| Elongation ASTM D–412 | 10 |
| Rossi Peak Flow at 305° F. ASTM D–569–48 | 1.18 |
| Flow-Out, IN², 315° F., 800 p.s.i.g. | 2.22 |

Vinyl chip floor tiles were then prepared as in Example 1 also employing a matrix-forming composition of the same formulation and properties used in Example 1. The vinyl chip tiles produced with the chips of this example prepared without addition of the chlorinated polyethylene were found to satisfy the requirements for floor covering including hardness, flexibility, indentation and indentation recovery, tensile strength and chemical resistance. Visual inspection of the tiles showed a good and clear matrix but the chips therein were smeared and lightly fused into the matrix. A comparison of the tiles produced in Examples 1 and 2 showed the tiles of Examples 1 and 2 showed the tiles of Example 1 to have the chips imbedded therein to be much more distinctly defined and much more aesthetically pleasing than the chips in the Example 2 tiles prepared without the addition of the chlorinated polyethylene.

Intrinsic viscosity, as the term is used herein, is defined as the limit, at infinite dilution, of specific vscosity ($N_{sp}$) divided by concentration (C) expressed in grams of resin per deciliter of solution. Specific viscosity is measured as: $(t-t_0)/t_0$, where $t$ is the effluent time for a given quantity of polymer solution from a standard pipette and $t_0$ is the effluent time for an equal quantity of the pure solvent. Intrinsic viscosity can be determined, accordingly, by plotting $$\frac{(N_{sp})}{C}$$

against C, at low concentrations, and extrapolating the resulting curve to 0 concentration.

The intrinsic viscosities reported herein are determined in accordance with ASTM Test D–1601–61, the units thereof being deciliters per gram. Intrinsic viscosities of the chlorinated polymers of this invention herein reported are in orthodichlorobenzene solvent at 100° C.; and for ethylene polymers herein the intrinsic viscosities are in decalin solvent at 135° C.

The densities of polymers reported herein are determined by ASTM Test D–792–60T at 23° C. and are in units of grams per milliliter.

Although certain preferred embodiments of the invention have been disclosed for purpose of illustration, it will be evident that various changes and modifications may be made therein without departing from the scope and spirit of the invention.

I claim:

1. In the manufacture of decorative vinyl chip covering involving the molding by heat and pressure of a vinyl matrix-forming composition having dispersed therein plasticized and filled chips containing as resin binder a vinyl polymer resin selected from the group consisting of polyvinyl chloride, vinyl chloride-vinyl acetate and vinyl chloride-vinylidene copolymers containing predominantly vinyl chloride, and polyvinyl chloride-polyvinyl acetate and polyvinyl chloride-polyvinylidene chloride mixtures containing predominantly polyvinyl chloride; the improvement of minimizing smearing of the chips into the matrix during molding by incorporating in the chip resin binder between about 5% to 30% by weight of the total binder of a chlorinated linear polyethylene having a chlorine content between about 30–55% by weight and high molecular weight corresponding to an intrinsic viscosity of at least 3.0 to 6.0 in o-dichlorobenzene at 100° C., said resin binder containing filler in an amount of at least about 300 up to 600 parts by weight per 100 parts of the binder.

2. In the manufacture of decorative vinyl chip covering involving the molding by heat and pressure of a vinyl matrix-forming composition having dispersed therein plasticized and filled chips containing as resin binder a vinyl polymer resin selected from the group consisting of polyvinyl chloride, vinyl chloride-vinyl acetate and vinyl chloride-vinylidene copolymers containing predominantly vinyl chloride, and polyvinyl chloride-polyvinyl acetate and polyvinyl chloride-polyvinylidene chloride mixtures containing predominantly polyvinyl chloride; the improvement of minimizing smearing of the chips into the matrix during molding by incorporating in the chip resin binder between about 5% to 30% by weight of the binder of a chlorinated linear polyethylene having a chlorine content between about 30–55% by weight, crystallinity between about 5% to 35% as measured by differential thermal analysis, and high molecular weight corresponding to an intrinsic viscosity of at least 3.0 to 6.0 in o-dichlorobenzene at 100° C., said resin binder containing filler in an amount of at least about 300 up to 600 parts by weight per 100 parts of the binder.

3. The method of claim 2 in which the chlorinated polyethylene has a chlorine content between about 40–50% by weight and crystallinity between about 10% to 30% as measured by differential thermal analysis.

4. The method of claim 2 in which the chip resin binder is composed of 70–85% polyvinyl chloride and 15–30% of said chlorinated polyethylene, and in which said composition has incorporated therein between 350–500 parts filler.

5. A decorative covering comprising a vinyl chloride polymer matrix having imbedded therein compounded chips containing: (A) 100 parts of resin binder composed of (a) about 70% to 95% by weight of a vinyl polymer resin selected from the group consisting of polyvinyl chloride, vinyl chloride-vinyl acetate and vinyl chloride-vinylidene copolymers containing predominantly vinyl chloride, and polyvinyl chloride-polyvinyl acetate and polyvinyl chloride-polyvinylidene chloride mixtures containing predominantly polyvinyl chloride, and (b) about 5% to 30% of a chlorinated linear polyethylene having a chlorine content between about 30–55% by weight and high molecular weight corresponding to an intrinsic viscosity of at least 3.0 to 6.0 in o-dichlorobenzene at 100° C.; (B) about 20 to 60 parts by weight plasticizer for said resin binder; and (C) about 300–600 parts by weight filler.

6. A decorative covering comprising a vinyl chloride polymer matrix having imbedded therein compounded chips containing: (A) 100 parts of resin binder composed of (a) about 70% to 95% by weight of a vinyl polymer resin selected from the group consisting of polyvinyl chloride, vinyl chloride-vinyl acetate and vinyl chloride-vinylidene copolymers containing predominantly vinyl chloride, and polyvinyl chloride-polyvinyl acetate and polyvinyl chloride-polyvinylidene chloride mixtures containing predominantly polyvinyl chloride, and (b) about 5% to 30% of a chlorinated linear polyethylene having a chlorine content between about 30–55% by weight, crystallinity between about 5% to 35% as measured by differential thermal analysis, and high molecular weight corresponding to an intrinsic viscosity of at least 3.0 to 6.0 in o-dichlorobenzene at 100° C.; (B) about 20 to 60 parts by weight plasticizer for said resin binder; and (C) about 300-600 parts by weight filler.

7. The decorative covering of claim 6 in which the chlorinated polyethylene has a chlorine content between about 40-50% by weight and crystallinity between about 10% to 30% as measured by differential thermal analysis.

8. The decorative covering of claim 6 in which the resin binder is composed of 70-85% polyvinyl chloride and 15-30% of said chlorinated polyethylene, and in which said composition has incorporated therein between 350-500 parts filler.

References Cited

UNITED STATES PATENTS

| | | | |
|---|---|---|---|
| 2,516,591 | 7/1950 | Remington | 260—41.5 |
| 2,987,102 | 6/1961 | Heinrichs | 117—76 |
| 3,000,754 | 9/1961 | Zentmyer | 117—21 |
| 3,165,560 | 1/1965 | Frey et al. | 260—897 |
| 3,194,775 | 7/1965 | Bartlett | 260—28.5 |

JAMES A. SEIDLECK, *Primary Examiner.*

R. A. WHITE, *Examiner.*